M. NEWCOMER.
CONTROLLING DEVICE FOR PNEUMATIC PIANO PLAYERS.
APPLICATION FILED AUG. 1, 1911. RENEWED SEPT. 9, 1915.
1,177,796.
Patented Apr. 4, 1916.
3 SHEETS—SHEET 1.
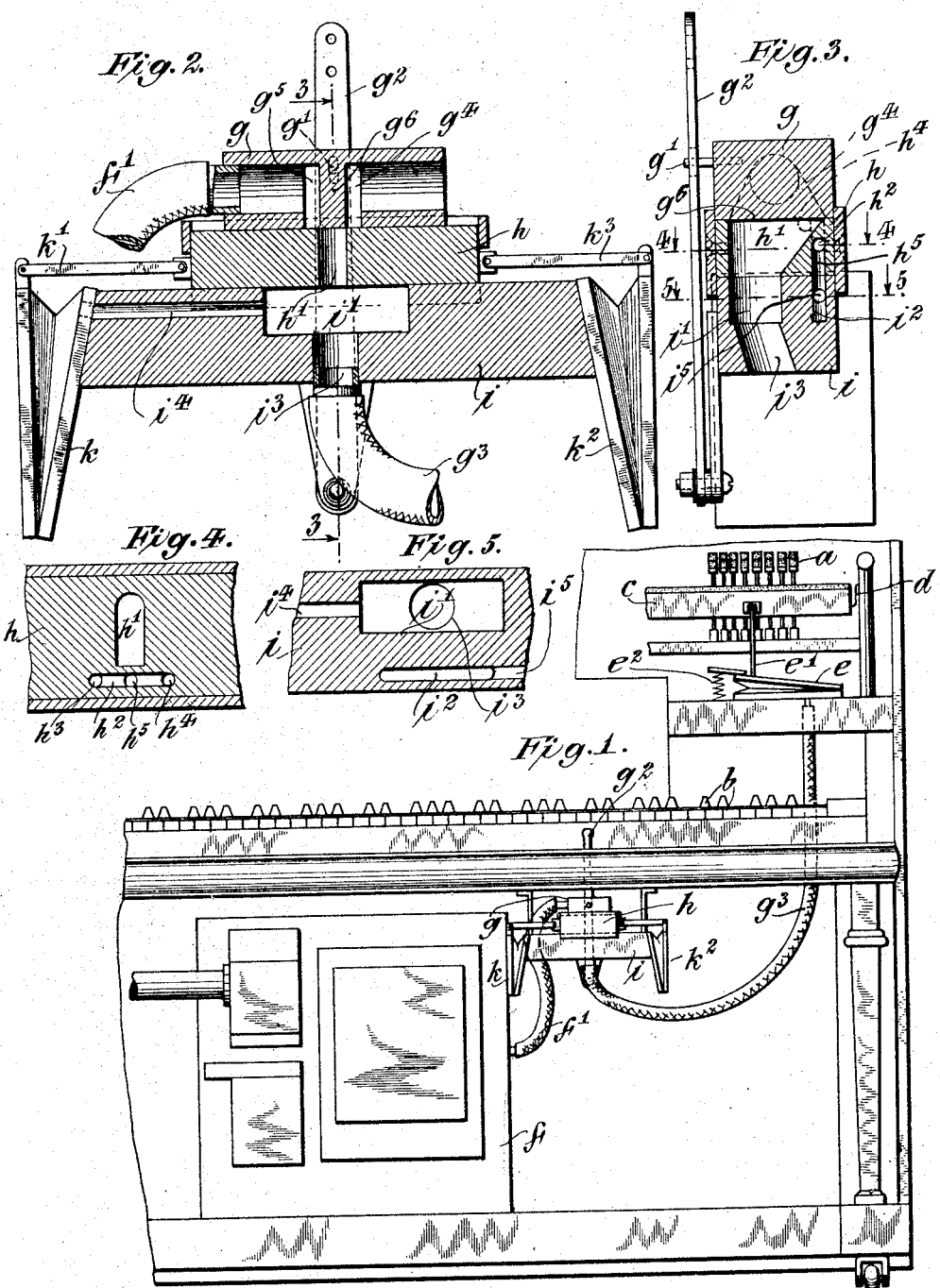

M. NEWCOMER.
CONTROLLING DEVICE FOR PNEUMATIC PIANO PLAYERS.
APPLICATION FILED AUG. 1, 1911. RENEWED SEPT. 9, 1915.
1,177,796.
Patented Apr. 4, 1916.
3 SHEETS—SHEET 2.
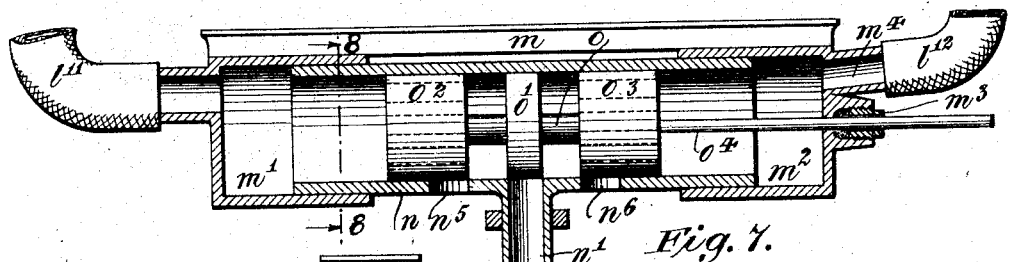
Fig. 7.
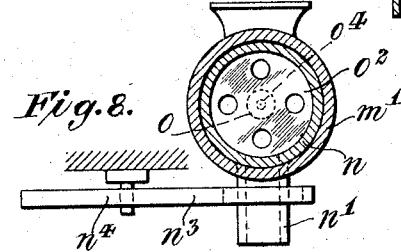
Fig. 8.
Fig. 6.
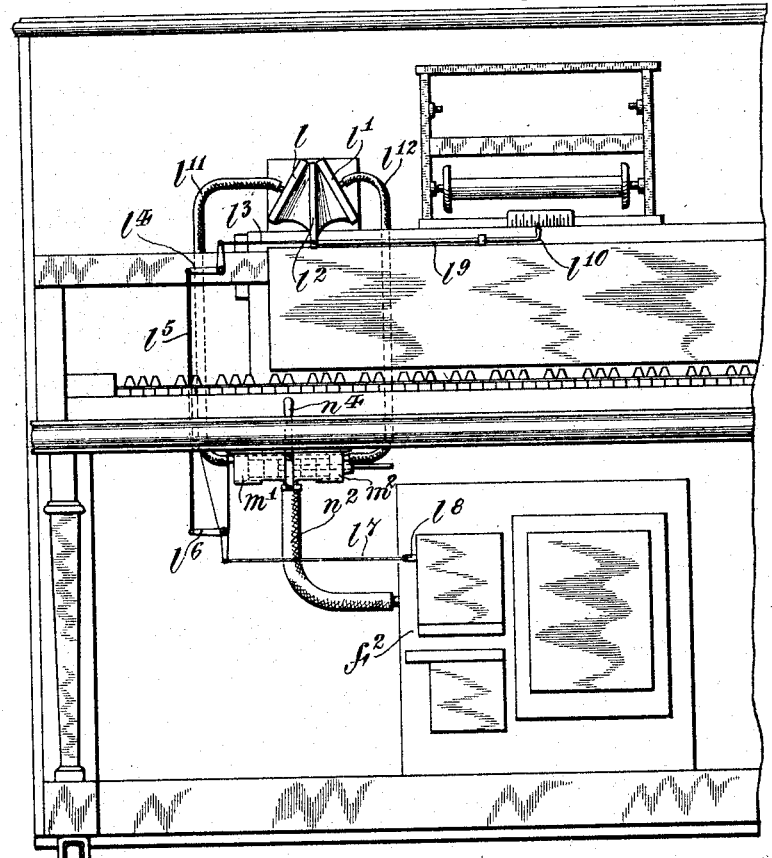

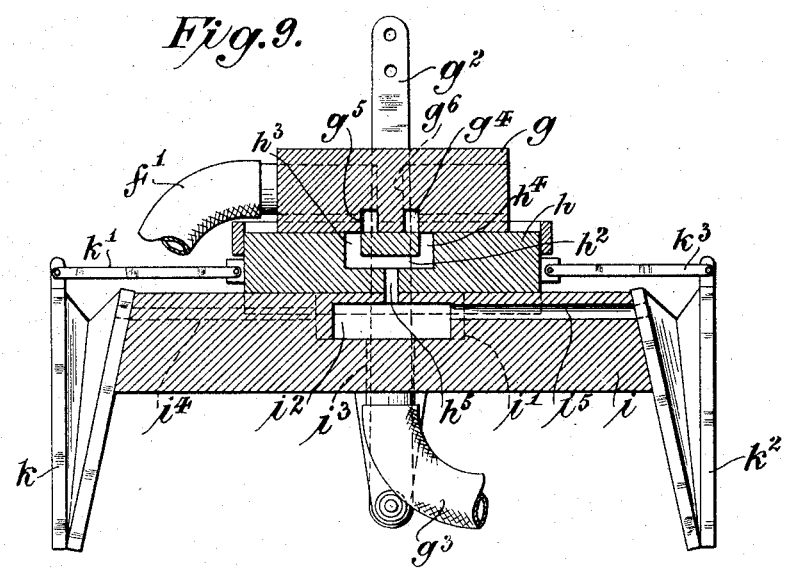

UNITED STATES PATENT OFFICE.

MARTIN NEWCOMER, OF NEW YORK, N. Y.

CONTROLLING DEVICE FOR PNEUMATIC PIANO-PLAYERS.

1,177,796.    Specification of Letters Patent.    Patented Apr. 4, 1916.

Application filed August 1, 1911, Serial No. 641,805. Renewed September 9, 1915. Serial No. 49,833.

*To all whom it may concern:*

Be it known that I, MARTIN NEWCOMER, a citizen of the United States, residing in the borough of Manhattan of the city of New York, county of New York, State of New York, have invented certain new and useful Improvements in Controlling Devices for Pneumatic Piano-Players, of which the following is a specification, reference being had to the accompanying drawings, which form a part hereof.

In Letters Patent of the United States No. 987,990 dated March 28, 1911, there are shown and described controlling devices for pneumatic piano players which are designed and adapted to enable the movement or operation of the controlled device, whatever it may be, to be checked at any point between its extremes. The controlling devices are shown and described in said patent as applied to the control of the bellows by which the movable hammer rest-rail is shifted, so that it can be stopped in any position between its extremes and any desired gradation in strength of tone be secured thereby. In the patented structure the pneumatic controlling devices, which are actuated by hand, are shown as applied directly to the bellows by which the rest-rail is shifted. This arrangement is practicable for some purposes and in some forms of players, but it has been found that for some uses for which the controlling devices would otherwise be available, it is impracticable to employ a structure in which the controlling devices are incorporated in the same structure with the bellows which they control, and that it is desirable to have the controlling devices more or less widely separated from the bellows or other part which is to be controlled. It is therefore the object of this invention to improve the controlling devices shown in said patent so that, in cases in which it is desirable that the controlling devices and the controlled bellows shall be more or less widely separated, it shall be possible to accomplish the same advantageous results with devices of the same general character.

The invention will be more particularly described hereinafter with reference to the accompanying drawings in which different embodiments thereof are illustrated and in which—

Figure 1 is a view in front elevation of so much of a player piano as is necessary to illustrate the application of the invention to the control of the bellows by which the hammer rest-rail is shifted, the casing being removed. Fig. 2 is a detail view, partly in longitudinal section, of the controlling devices. Fig. 3 is a detail view in section on the plane indicated by the line 3—3 of Fig. 2. Figs. 4 and 5 are detail views in section on the plane indicated by the lines 4—4 and 5—5 respectively of Fig. 3. Fig. 6 is a view in front elevation of so much of a player piano as is necessary to illustrate the application of a different embodiment of the invention to the control of the tempo devices, including the tempo indicator, the casing being removed. Fig. 7 is a detail view of the controlling devices in longitudinal section. Fig. 8 is a detail view in section on the plane indicated by the line 8—8 of Fig. 7. Fig. 9 is a detail view in vertical section through the chamber $i^2$.

In Figs. 1–5 of the drawings the invention is illustrated as applied to the control of the movable hammer rest-rail, or of the bellows by which it is moved. In Fig. 1 are shown the hammers $a$ and the finger keys $b$ by which they are actuated in the usual manner. The jacks and other devices between the keys and the hammers are not shown but may be of any usual or preferred construction and arrangement. The hammers may also be actuated by automatic playing devices, which may also be of any usual or preferred construction and are not shown. The movable rest-rail $c$ is shown as carried by pivoted supporting arms $d$ and as adapted to be moved toward and from the hammers, to vary their throw, by a power bellows $e$ which acts through a rod $e'$, the bellows being collapsed through connection with the vacuum system of the player and expanded, as usual, by the spring $e^2$. The purpose of the present invention is to provide such controlling devices for the connection between the power bellows $e$ and the vacuum system, represented by the power bellows $f$, as to permit the expansion and the collapsing of the bellows $e$ to be checked at any point between the extremes, so that the rest-rail $d$ shall be held at any point between the extremes of its movement. These controlling devices may be placed at any convenient point between the power bellows and the operating bellows. As shown, the power bellows is connected by the flexible tube $f'$ with one member $g$ of the controlling devices. This member $g$ is movable by hand in any suitable manner, being shown in the drawings as having a pin $g'$ which engages a lever $g^2$ so that the member $g$ can be shifted more or less to the right or left as may be necessary to effect the desired shifting of the rest-rail $d$. The member $g$ is in effect a movable valve member through which, by means of a flexible tube $g^3$, the operating bellows $e$ can be connected with or disconnected from the power bellows $f$. As shown in this embodiment of the invention, the valve member $g$ is a longitudinally movable valve block which is provided with two valve ports $g^4$ and $g^5$ which are separated by an interposed valve plug $g^6$. The primary valve member $g$ is moved longitudinally with reference to a secondary member $h$ which is also movable longitudinally with respect to the valve plug $g^6$, being mounted movably upon a stationary member $i$. The member $h$, in its movement, follows the movements of the member $g$, being subject to and acted upon by the vacuum and air pressure which are controlled by the movement of the member $g$.

The secondary member $h$ has extending through it a port or passage $h'$, which is blanked or shut off, when both members $g$ and $h$ are in normal position, as shown in Fig. 1, by the valve plug $g^6$ of the member $g$. The member $h$ has also formed, in front of the port or passage $h'$, a longitudinal channel $h^2$ which has at its ends ports or passages $h^3$ $h^4$, (shown in dotted lines in Fig. 2), which open at the upper surface of the member $h$. When the two members $g$ and $h$ are in their central positions, as shown in Fig. 1 and the port or passage $h'$ is blanked or shut off by the valve plug $g^6$, the ports $h^3$ and $h^4$ are also blanked or shut off by the body of the primary member $g$, but if the primary member is moved to one side, as for example, to the left hand in Fig. 2, then the port $h'$ is uncovered by the plug $g^6$ and is opened to the atmosphere through the open end of the member $g$, and the port $g^5$ overlaps the port $h^3$, thereby placing the port $h^3$ and channel $h^2$ in communication with the vacuum system through the flexible pipe $f'$, while the port $h^4$ still remains blanked or shut off. If the member $g$ is moved to the right hand from its central position the connections are reversed, the port $h'$ being connected to the vacuum system and the port $h^4$ being connected to atmosphere.

The stationary member $i$ has therein an elongated chamber $i'$ which is in constant communication with the port $h'$, and an elongated chamber $i^2$, which is in constant communication with the port $h^5$ from the channel $h^2$. The chamber $i'$ communicates through a port $i^3$ and a pipe $g^3$ with the operating bellows $e$, the collapsing or expansion of which is to be controlled. Chamber $i'$ also communicates, through a passage $i^4$, with a bellows $k$, the movable member of which is connected by a link $k'$ with the secondary controlling member $h$. The chamber $i^2$ also communicates, through a channel $i^5$, with a bellows $k^2$, the movable member of which is connected by the link $k^3$ with the other end of the movable member $h$. The movable member $h$ is therefore subject to the pressure, either atmospheric or less than atmospheric which is determined by the movement of the primary controlling member $g$, and moves in the same direction as the primary controlling member $g$, its movement in that direction continuing until it has overtaken the member $g$ and stands in the same relative position therewith that it did at the beginning, that is, until the port $h'$ is again blanked or shut off by the valve plug $g^6$. This is true whether the primary member $g$ is moved in one direction or the other. It will be obvious, also, that when one of the two bellows $k$ and $k^2$, through which this predetermined pressure either atmospheric or less than atmospheric acts upon the secondary member $h$, is connected to the vacuum system, to be collapsed thereby, the other of the two bellows is connected to atmosphere and is therefore permitted to expand. Furthermore, as will be obvious, when the controller lever $g^2$ is moved to the left hand, in Fig. 2, the operating bellows $e$ is connected to atmosphere through the port $h'$ and the port $g^6$ and is permitted to expand under the influence of its spring $e^2$, such expansion continuing until the connection to atmosphere is cut off through the blanking or shutting off of the port $h'$ by the valve plug $g^6$, while if the controlling lever is moved to the right hand, the operating bellows $e$ is connected to the vacuum system through the port $h'$, port $g^5$ and pipe $f'$, the collapsing continuing until, in the movement of the block $h$, the port $h'$ is again blanked by the valve plug $g^6$.

Referring now to the construction shown in Figs. 6–8 of the drawings, it will be seen not only that the construction of the controlling devices is modified considerably, but that the controlling devices are double, that is, that when moved in one direction they act upon one operating bellows and when moved in the opposite direction act upon another operating bellows. The two operating bellows $l$ and $l'$ are shown as opposed and adapted to act upon a common movable member $l^2$ which is connected through rod $l^3$ a bell crank $l^4$, rod $l^5$, bell crank $l^6$ and rod $l^7$ with the tempo controlling valve indicated at $l^8$, and through the rod $l^9$ with the tempo indicator $l^{10}$. Movement of the common movable member $l^2$ to the left hand, for example, closes the valve $l^8$ and retards the tempo and produces corresponding indication, while movement to the right hand accelerates the tempo and produces the corresponding indication. The two operating bellows $l$ and $l'$ are opposed to each other, the one being permitted to expand, through connection to atmosphere, while the other is collapsed through connection to the vacuum system represented by the power bellows $f^2$. The two bellows are connected by suitable pipes $l^{11}$ and $l^{12}$, with the opposite ends $m'$ and $m^2$ of the stationary member $m$. Within the stationary member, so as to be movable longitudinally therein, is a primary controlling member $n$, which has a nipple $n'$ for connection by a flexible pipe $n^2$ with the power bellows $f^2$, and is engaged, by a link $n^3$, with a controlling lever $n^4$. The primary controlling member $n$ is also provided with ports $n^5$ $n^6$ for communication with the atmosphere. The secondary movable member of the controlling devices, in this instance, comprises a central stem $o$, a solid piston and valve plug $o'$ which, in its normal position, blanks the nozzle $n'$, sleeves $o^2$ $o^3$, which are perforated longitudinally for the passage of air, and are adapted to blank both ports $n^5$ and $n^6$ when the piston and valve plug $o'$ is in its middle position. A rod $o^4$ is connected to this secondary movable member and is extended through an adjustable stuffing box $m^3$, so that sufficient frictional resistance to the movement of the secondary member may be offered to counteract the friction between the primary member and the secondary member which tends to make the secondary member move with the primary member, it being desired that the secondary member, as above, shall be moved in the same direction as the primary member, but following the same, by the air pressure which is determined by the movement of the primary member. In the operation of this embodiment of the invention it will be seen that if the primary movable member $n$ is first moved to the right hand in Fig. 7, the right hand operating bellows $l'$ will be connected to the vacuum system through pipe $l^{12}$, nipple $m^4$, cylinder $m^2$, longitudinally perforated sleeve $o^3$ within the movable member $n$, nipple $n'$ and tube $n^2$. In the movement of the primary member $n$ to the right from its central position the port $n^6$ continues to be blanked or shut off by the sleeve $o^3$, but port $n^5$ is opened by the sleeve $o^2$ and atmospheric pressure is admitted within the left hand portion of the movable member. This permits the left hand bellows $l$ to expand and also acts against the piston $o'$ to move it toward the right until it once more blanks or shuts off the nozzle $n'$, this again establishing an equilibrium of pressures and bringing the common movable member $l^2$ of the two bellows to rest in its new position. If the controller lever $n^4$ is moved to the left, instead of to the right, the operations are reversed and the movable member $l^2$ will be moved to the left and checked in its new position.

It will be observed that in the construction shown in Figs. 1–5, as well as in that shown in Figs. 6–7, the extent of the movement of the operated part and the direction of movement thereof will depend upon the extent and directional movement of the controller lever, and that the operated or controlled part will be brought to rest in a new position, to one side or the other of its normal or middle position, as determined by the movement of the controller lever. It will also be observed that in the construction shown in Figs. 1–5 the bellows $k^2$ acts to move the member $h$ in opposition to the bellows $k$ and that the force in opposition might be exerted by other means.

It will be understood that when the power bellows $e$ is once cut off from vacuum or atmosphere, it is then in a condition of equilibrium and its position will be maintained until it is again acted upon by negative vacuum pressure or atmospheric pressure. Furthermore, so long as it remains connected either with the vacuum system or with the atmosphere it will close or open, as the case may be, and the length of time during which it is connected either to vacuum or to atmosphere is determined by the length of time required for the secondary member $h$, in the one construction, or the secondary member $o'$, in the other construction, to cut off the communication between the bellows $e$ and vacuum or atmosphere. In the one case this is determined by the relative strength of the actuating bellows and in the other case by the resistance offered to the movement of the secondary member $o'$ by friction of the stuffing box $m^3$. The secondary member, in each case, is therefore maintained in the position to which it is moved by the establishing of a condition of equilibrium, which condition will be maintained, except for leakage, until it is disturbed by the connection of the actuating bellows to the atmosphere or to the vacuum system as the case may be.

It will be obvious that various other modifications of the construction and relation to parts may be made to suit different conditions of use and that the invention, therefore, is not to be limited to the particular construction shown and described herein.

I claim as my invention:—

1. In a device of the character described, the combination of a pneumatic device or part to be operated, a relatively stationary member having a chamber connected to the part to be operated, means adapted to be actuated by hand to control the admission of pressure, atmospheric or less than atmospheric to said chamber and means controlled by the operation of said first named means to cut off communication between said chamber and the vacuum system or the atmosphere.

2. The combination with a vacuum system and a bellows to be operated, of a relatively stationary member having a chamber connected to said bellows, means adapted to be actuated by hand to control the admission of pressure, atmospheric or less than atmospheric to said chamber and means controlled by the operation of said first named means to cut off communication between said chamber and the atmosphere or the vacuum system.

3. In a device of the character described, the combination of a relatively stationary member having a chamber and a connection therefrom in which the pressure is to be controlled, a primary movable member adapted to be moved by hand and having a connection to the vacuum system and to the atmosphere and adapted to control the admission of pressure, atmospheric or less than atmospheric to the chamber of the stationary member and a secondary movable member moved by the operation of the primary member to cut off communication to the chamber of the stationary member established by the movement of the primary member.

4. The combination with a vacuum system and a bellows to be operated by a connection therewith, of a stationary member having a chamber connected to said bellows, a primary movable member having a connection to the vacuum system and to the atmosphere and adapted to control the connection of said chamber to the vacuum system and to the atmosphere, and a second movable member adapted to be moved by the pressure determined by the primary member to cut off the communication to the chamber of the stationary member established by the movement of the primary member.

5. In a device of the character described, the combination of a relatively stationary member having a connection to the part to be operated, a primary movable member adapted to be actuated by hand and having a connection to the vacuum system, and a secondary movable member adapted to be moved by the pressure determined by the movement of said primary member, the primary member and the secondary member having the one a valve plug and the other a port communicating with the part to be operated whereby communication with the part to be operated which is established by the movement of the primary member is cut off by the movement of the secondary member.

6. The combination with a vacuum system and a bellows to be operated, of a relatively stationary member having a connection to said bellows, a primary movable member adapted to be actuated by hand and having a connection to the vacuum system, and a secondary movable member adapted to be moved by the pressure determined by the movement of said primary member, the primary member and the secondary member having the one a valve plug and the other a port communicating with the part to be operated whereby communication with the part to be operated which is established by the movement of the primary member is cut off by the movement of the secondary member.

7. In a device of the character described, the combination of a relatively stationary member having a chamber with a connection to the part to be operated, a primary movable member having a connection to the vacuum system and a connection to atmosphere, and a secondary movable member adapted to be moved by the pressure determined by the movement of said primary member and having a passage to establish communication between the chamber of the stationary member and the vacuum system or the atmosphere, the primary member and the secondary member having the one a valve plug and the other a port communicating with said chamber, whereby communication with said chamber which is established by the movement of the primary member is cut off by the movement of the secondary member.

8. The combination with a vacuum system and a bellows to be operated, of a relatively stationary member having a chamber with a connection to said bellows, a primary movable member adapted to be actuated by hand and having a connection to the vacuum system and a connection to the atmosphere, and a secondary movable member adapted to be moved by the pressure determined by the movement of the primary member and having a passage to establish communication between said chamber and the vacuum system or the atmosphere through the primary member, whereby communication with said bellows which is established by the movement of the primary member is cut off by the movement of the secondary member.

9. In a device of the character described, the combination of a relatively stationary member having a chamber connected to the part to be operated, a primary movable member having a chamber at one end connected to the vacuum system, a chamber at the other end open to the atmosphere, a central valve plug, and ports on opposite sides of the valve plug, a secondary movable member having a passage adapted to establish communication between one or the other of said ports and said chamber and to be blanked or shut off by said valve plug, and oppositely acting bellows connected to said secondary member, said stationary member and said secondary member having passages to establish communication between one of said bellows and the atmosphere and between the other of said bellows and the vacuum system through the ports of the primary member.

10. In a device of the character described, the combination of a relatively stationary member having a main chamber connected to the part to be operated and a secondary chamber, a primary movable member having a connection at one end to the vacuum system, a connection at the other end to the atmosphere, a central valve plug, and ports on opposite sides of said central valve plug, a secondary movable member having a passage to establish communication between said main chamber of the stationary member and one end or the other of the primary member through the corresponding port, and having also passages to establish communication between the secondary chamber and one end or the other of the primary member through the corresponding port, and oppositely acting bellows connected respectively with said main chamber and with said secondary chamber and connected mechanically with said secondary member.

This specification signed and witnessed this 27th day of July, A. D. 1911.

MARTIN NEWCOMER.

Signed in the presence of—
W. B. GREELEY,
AMBROSE L. O'SHEA.

Copies of this patent may be obtained for five cents each, by addressing the "Commissioner of Patents, Washington, D. C."